United States Patent
Ha

(10) Patent No.: US 10,088,721 B2
(45) Date of Patent: Oct. 2, 2018

(54) LIQUID CRYSTAL DISPLAY

(71) Applicant: LG Display Co., Ltd., Seoul (KR)

(72) Inventor: Tai Hyeon Ha, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 78 days.

(21) Appl. No.: 14/937,334

(22) Filed: Nov. 10, 2015

(65) Prior Publication Data

US 2016/0147105 A1    May 26, 2016

(30) Foreign Application Priority Data

Nov. 24, 2014  (KR) ........................ 10-2014-0164800

(51) Int. Cl.
| | | |
|---|---|---|
| *G02F 1/1345* | (2006.01) | |
| *G02B 6/00* | (2006.01) | |
| *G02F 1/1362* | (2006.01) | |
| *G02F 1/1335* | (2006.01) | |
| *H01R 12/70* | (2011.01) | |

(52) U.S. Cl.
CPC .......... *G02F 1/13452* (2013.01); *G02B 6/00* (2013.01); *G02F 1/136204* (2013.01); *G02F 1/1345* (2013.01); *G02F 1/133615* (2013.01); *G02F 2201/121* (2013.01); *H01R 12/7076* (2013.01)

(58) Field of Classification Search
CPC .............. G02F 1/1345; G02F 1/13452; G02F 2001/13456; G02F 1/13458; G02F 2001/13317
See application file for complete search history.

(56) References Cited

U.S. PATENT DOCUMENTS

| | | | | |
|---|---|---|---|---|
| 2007/0002005 | A1* | 1/2007 | Kim | .................... G09G 3/3655 |
| | | | | 345/103 |
| 2008/0158469 | A1* | 7/2008 | Lee | ................... G02F 1/133308 |
| | | | | 349/58 |
| 2009/0015528 | A1* | 1/2009 | Sheu | ..................... G09G 3/3696 |
| | | | | 345/87 |
| 2012/0133599 | A1 | 5/2012 | Cho et al. | |
| 2013/0200409 | A1* | 8/2013 | Abe | ......................... H01L 33/62 |
| | | | | 257/91 |
| 2014/0184964 | A1* | 7/2014 | Byeon | ............... G02F 1/134363 |
| | | | | 349/33 |

FOREIGN PATENT DOCUMENTS

| | | | |
|---|---|---|---|
| CN | 102478998 A | 5/2012 | |
| CN | 103247662 A | 8/2013 | |
| CN | 103913905 A | 7/2014 | |
| JP | 2003-036061 A | 2/2003 | |
| KR | 20090060054 A | * | 6/2009 |

* cited by examiner

*Primary Examiner* — Jessica M Merlin
(74) *Attorney, Agent, or Firm* — Dentons US LLP

(57) ABSTRACT

A display device includes a display panel including a first substrate and a second substrate; a source driver flexible film attached to the second substrate; a source driver circuit attached to the source driver flexible film; a common voltage line connected to the source driver circuit; common voltage compensation circuits connected to the common voltage line; and common voltage supply lines and common voltage feedback lines connecting the common voltage line and the common voltage compensation circuits, respectively, wherein the common voltage compensation circuits include a circuit line extending at a rear of the display panel connecting to a connection terminal on the source driver circuit.

19 Claims, 9 Drawing Sheets

LIQUID CRYSTAL DISPLAY

CROSS REFERENCE TO RELATED APPLICATIONS

This application claims the benefit of the Korean Patent Application No. 10-2014-0164800 filed on Nov. 24, 2014, which is hereby incorporated by reference for all purposes as if fully set forth herein.

BACKGROUND

Field of the Disclosure

The present invention relates to a liquid crystal display.

Discussion of the Related Art

A liquid crystal display device has been more commonly used because of its characteristics such as lightweight, thin profile, low power consumption, and low power driving. For example, the liquid crystal display device is widely applied to portable computers such as notebook PC, office automation devices, audio/video devices, and indoor and outdoor advertising display devices. The liquid crystal display device displays images by controlling an electric field applied to a liquid crystal layer to modulate light transmitted from a backlight unit.

FIG. 1 is an exemplary view illustrating a liquid crystal display of the prior art. Referring to FIG. 1, the liquid crystal display includes gate lines, data lines, a display panel 1, which includes a common voltage line VcomL, gate driving circuits 2 supplying gate signals to the gate lines, gate flexible films 3 on which the gate driving circuits 2 are mounted, source driving circuits 4 supplying data voltages to the data lines, source flexible films 5 on which the source driving circuits 4 are mounted, a common voltage compensator 6 supplying a compensated common voltage to the common voltage line VcomL, and a source printed circuit board 7 on which the common voltage compensator 6 is mounted.

The display panel 1 includes pixels displaying images. Each of the pixels modulates light entering from a backlight unit (not shown) by driving a liquid crystal of a liquid crystal layer through an electric field between the data voltage supplied to a pixel electrode and the common voltage supplied to a common electrode.

The common voltage compensator 6 may include a plurality of common voltage compensation circuits 6a, 6b, 6c, and 6d. The common voltage may be affected by unspecified noise generated in the display panel 1. The common voltage compensator 6 may receive the common voltage affected by the unspecified noise through a feedback line, and generate a compensated common voltage from the received common voltage to supply the generated common voltage to the common voltage line VcomL of the display panel 1 through the common voltage supply line. For example the unspecified noise by which the common voltage is affected may be the gate signals of the gate lines, or external static electricity.

The first common voltage compensation circuit 6a may receive a common voltage through a first feedback line FL1 and supply the compensated common voltage to the common voltage line VcomL of the display panel 1 through a first common voltage supply line VSL1. The first feedback line FL1 and the first common voltage supply line VSL1 may be coupled to the common voltage line VcomL at an upper left portion of the display panel 1.

The second common voltage compensation circuit 6b may receive a common voltage through a second feedback line FL2 and supply the compensated common voltage to the common voltage line VcomL of the display panel 1 through a second common voltage supply line VSL2. The second feedback line FL2 and the second common voltage supply line VSL2 may be coupled to the common voltage line VcomL at a lower left portion of the display panel 1.

The third common voltage compensation circuit 6c may receive a common voltage through a third feedback line FL3 and supply the compensated common voltage to the common voltage line VcomL of the display panel 1 through a third common voltage supply line VSL3. The third feedback line FL3 and the third common voltage supply line VSL3 may be coupled to the common voltage line VcomL at an upper right portion of the display panel 1.

The fourth common voltage compensation circuit 6d may receive a common voltage through a fourth feedback line FL4 and supply the compensated common voltage to the common voltage line VcomL of the display panel 1 through a fourth common voltage supply line VSL4. The fourth feedback line FL4 and the fourth common voltage supply line VSL4 may be coupled to the common voltage line VcomL at a lower right portion of the display panel 1.

In this case, the first and third feedback lines FL1 and FL3 and the first and third common voltage supply lines VSL1 and VSL3 may be formed as a line on glass type and coupled to the common voltage line VcomL at the upper left and right portions of the display panel 1. Also, the second and fourth feedback lines FL2 and FL4 and the second and fourth common voltage supply lines VSL2 and VSL4 may be coupled to the common voltage line VcomL at the lower left and right portions of the display panel 1 by passing through the gate circuit films 3.

Each of the second and fourth feedback lines FL2 and FL4 and the second and fourth common voltage supply lines VSL2 and VSL4 has a longer length than that of each of the first and third feedback lines FL1 and FL3 and the first and third common voltage supply lines VSL1 and VSL3. Therefore, a problem occurs in that there is a great difference between each resistance of the second and fourth feedback lines FL2 and FL4 and the second and fourth common voltage supply lines VSL2 and VSL4 and each resistance of the first and third feedback lines FL1 and FL3 and the first and third common voltage supply lines VSL1 and VSL3.

Therefore, a difference between the common voltage from the second and fourth feedback lines FL2 and FL4 and the second and fourth common voltage supply lines VSL2 and VSL4 and the common voltage from the first and third feedback lines FL1 and FL3 and the first and third common voltage supply lines VSL1 and VSL3 may occur. That is, it is desirable to maintain the common voltage to one level voltage for driving the liquid crystal display, but the common voltage may not be maintained to the one level voltage.

To reduce each resistance of the second and fourth feedback lines FL2 and FL4 and the second and fourth common voltage supply lines VSL2 and VSL4, as shown in FIG. 2, a gate printed circuit board 8 connected to the gate flexible film 3 may also be provided. In this case, because the second and fourth feedback lines FL2 and FL4 and the second and fourth common voltage supply lines VSL2 and VSL4 are coupled to the common voltage line VcomL at the lower left and right portions of the display panel 1 after being routed through the gate printed circuit board 8, each length of the second and fourth feedback lines FL2 and FL4 and the second and fourth common voltage supply lines VSL2 and VSL4 may be reduced. Therefore, each resistance of the second and fourth feedback lines FL2 and FL4 and the second and fourth common voltage supply lines VSL2 and VSL4 may be reduced, whereby the difference between each resistance of the second and fourth feedback lines FL2 and FL4 and the second and fourth common voltage supply lines VSL2 and VSL4 and each resistance of the first and third feedback lines FL1 and FL3 and the first and third common voltage supply lines VSL1 and VSL3 may be reduced. However, a problem occurs in that the device cost is increased because the gate printed circuit board 8 is added.

SUMMARY OF THE DISCLOSURE

Accordingly, the present invention is directed to a liquid crystal display that substantially obviates one or more problems due to limitations and disadvantages of the related art.

An advantage of the present invention is to provide a liquid crystal display that may reduce a length of a line for connecting a common voltage supply circuit with a common voltage line provided at an opposite side of a lower substrate to which a source flexible film is attached.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DISCLOSURE

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an", and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes", and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, a liquid crystal display according to the embodiments of the present invention will be described in detail with reference to the accompanying drawings.

Figure 1:
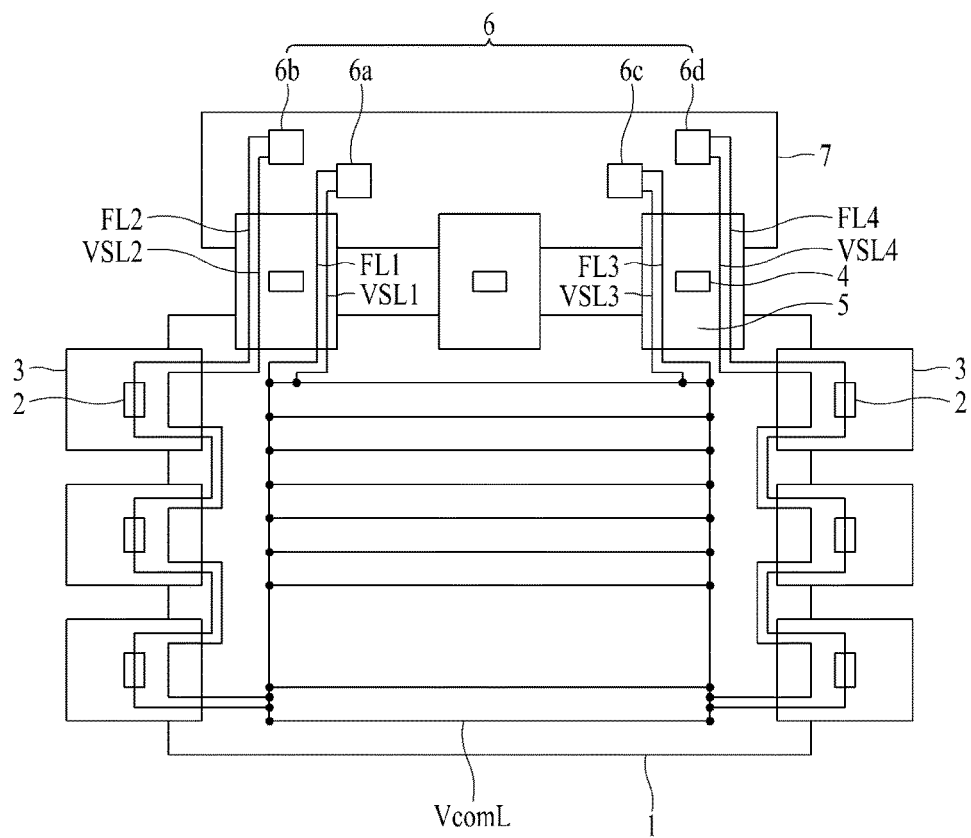
FIG. 1 is an exemplary view illustrating a liquid crystal display of the prior art.
Figure 2:
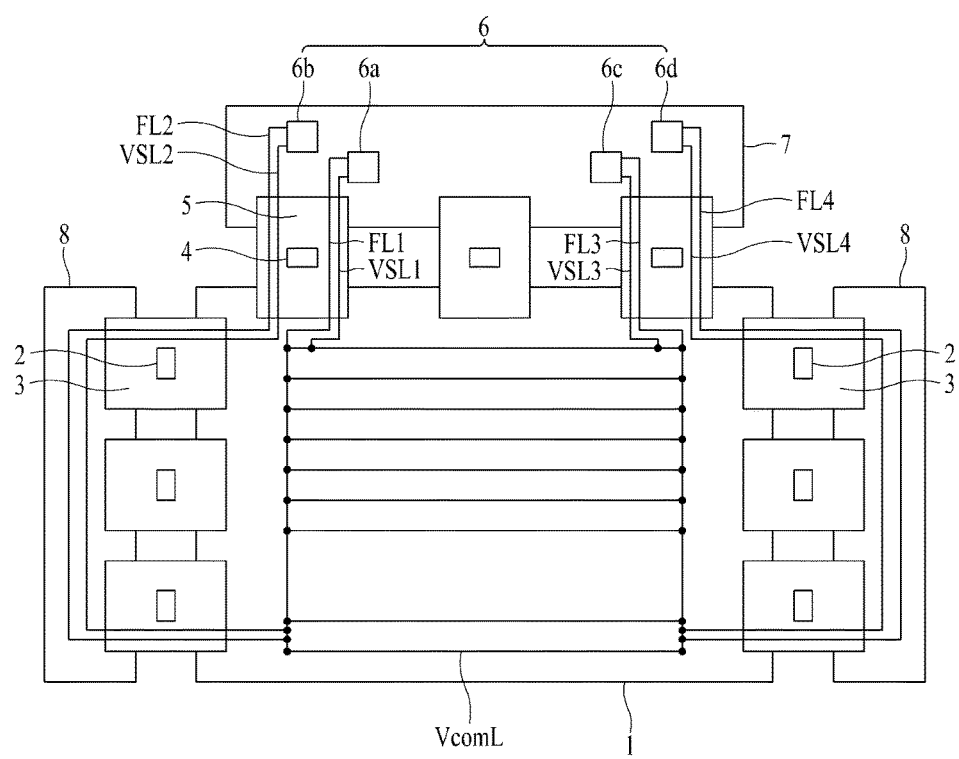
FIG. 2 is another exemplary view illustrating a liquid crystal display of the prior art.
Figure 3:
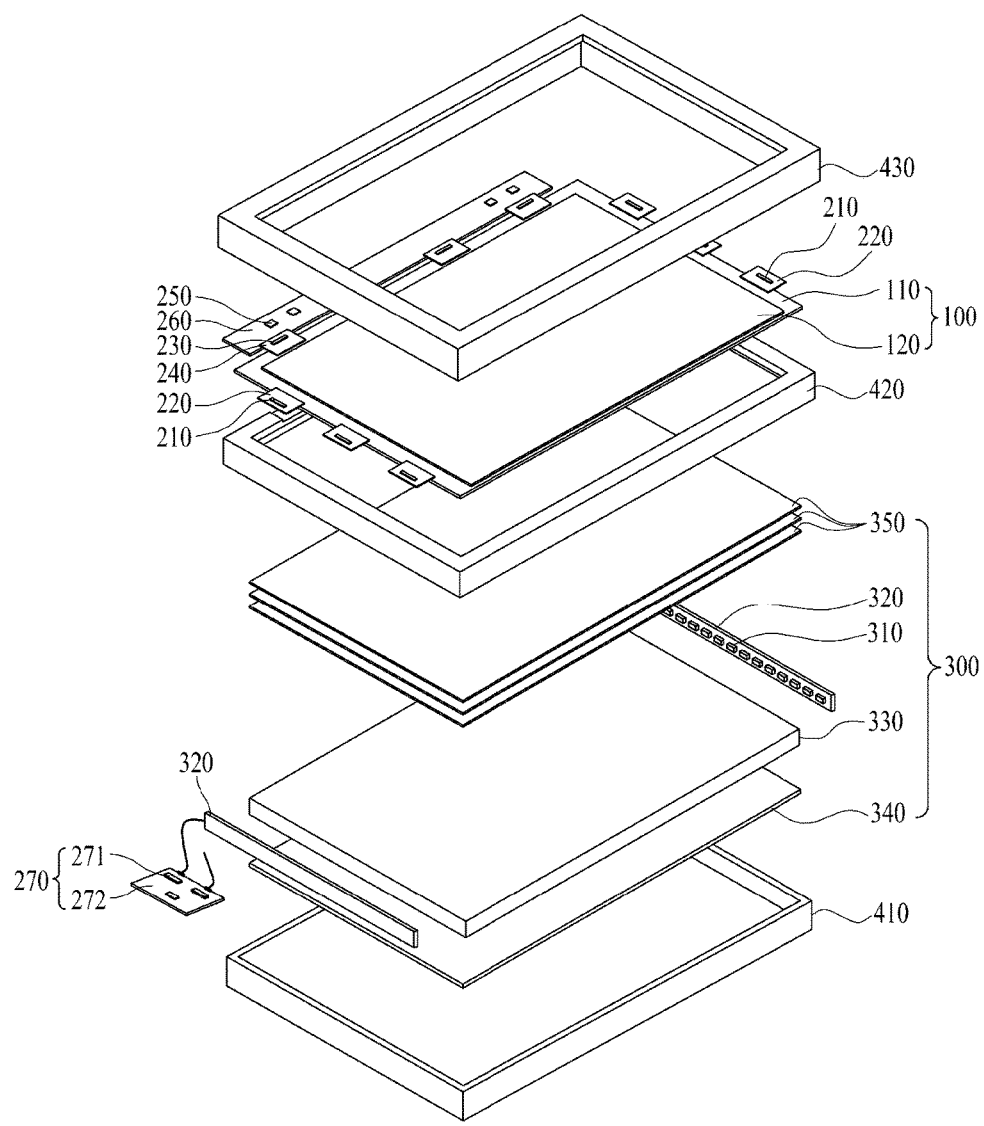
FIG. 3 is an exploded perspective view illustrating a liquid crystal display according to the embodiment of the present invention.

FIG. 3 is an exploded perspective view illustrating a liquid crystal display according to the embodiment of the present invention. Referring to FIG. 3, the liquid crystal display according to the embodiment of the present invention includes a display panel 100, a driving circuit unit for driving the display panel 100, a backlight unit 300, and a guide and case member 410, 420, 430.

The display panel 100 includes a lower substrate 110, an upper substrate 120, and a liquid crystal layer between the lower substrate 110 and the upper substrate 120. The lower substrate 110 and the upper substrate 120 may be glass or plastic.

The lower substrate 110 may be larger than the upper substrate 120. Gate flexible films 220 and source flexible films 240 may be attached to an upper corner of the lower substrate 110, which is not covered by the upper substrate 120.

The lower substrate 110 of the display panel 100 may include data lines, gate lines crossing the data lines, and a common voltage line. Pixels may be arranged in the display panel 100 in a matrix with a crossing structure of the data lines and the gate lines. Each of the pixels supplies data voltages of the data lines to a pixel electrode in response to gate signals of the gate lines. For this reason, each of the pixels controls transmittance of the light entering from a backlight unit by driving a liquid crystal of a liquid crystal layer through an electric field generated by a potential difference between the data voltage supplied to the pixel electrode and a common voltage supplied to a common electrode through a common voltage line.

The upper substrate 120 of the display panel 100 may include a black matrix and a color filter. However, if the display panel 100 is formed in a color filter on TFT (COT) array, the black matrix and the color filter may be on the lower substrate 110. The common electrode may be on the upper substrate 120 in a vertical electric field driving mode such as a twisted nematic (TN) mode and a vertical alignment (VA) mode, or may be on the lower substrate 110 in a horizontal electric field driving mode such as an in plane switching (IPS) mode and a fringe field switching (FFS) mode. A polarizing panel may be attached to each of the lower substrate 110 and the upper substrate 120 of the display panel 100, and an alignment film for setting a pre-tilt angle of the liquid crystal may be formed on an inner surface of the substrates adjacent to the liquid crystal.

The driving circuits unit includes gate driving circuits 210, gate flexible films 220, source driving circuits 230, source flexible films 240, common voltage compensation circuits 250, a circuit board 260, and a light source driving unit 270.

The gate driving circuits 210 supply the gate signals to the gate lines of the lower substrate 110. If a driving chip is used as each of the gate driving circuits 210, each gate driving circuit 210 may be mounted on the gate flexible film 220 in a chip on film (COF) mode. The gate flexible films 220 may be attached to a corner of the lower substrate 110, which is not covered by the upper substrate 120. Alternatively, the gate driving circuit 210 may be formed directly on the lower substrate 110 in a gate driver in panel (GIP) mode. In this case, the gate flexible films 220 may be omitted.

The source driving circuits 230 supply the data voltages to the data lines of the lower substrate 110. If a driving chip is used as each of the source driving circuits 230, each source driving circuit 230 may be mounted on the source flexible film 240 in a chip on film (COF) mode. Alternatively, the source driving circuits 230 may be adhered to the lower substrate 110 in a chip on glass (COG) or chip on plastic (COP) mode. The source flexible films 240 may be attached to a corner of the lower substrate 110, which is not covered by the upper substrate 120, and the circuit board 260.

The common voltage may be affected by unspecified noise generated in the display panel 1, and the common voltage compensation circuits 250 are for compensating for the common voltage affected by the noise. Each of the common voltage compensation circuits 250 receives the common voltage fed back from the common voltage lines of the display panel 100, and supplies the common voltage of which noise is compensated using the feedback common voltage, to the common voltage line of the display panel 100. The common voltage compensation circuits 250 will be described later in detail with reference to FIGS. 4 and 5. The common voltage compensation circuits 250 may be mounted on the circuit board 260. The circuit board 260 may be attached to the source flexible films 240. A printed circuit board may be used as the circuit board 260.

The light source driving unit 270 includes a light source driving circuit 271 and a light source circuit board 272. The light source driving circuit 271 supplies driving current to light sources 310 to generate light. The light source driving circuit 271 may be mounted on the light source circuit board 272. Alternatively, the light source driving circuit 271 may be mounted on the circuit board 260. In this case, the light source circuit board 272 may be omitted.

The driving circuit unit may include a timing control circuit and a control circuit board on which the timing control circuit is mounted. In this case, the control circuit board may be coupled to the circuit board 260 through a predetermined flexible cable.

The backlight unit 300 includes the light sources 310, a light source circuit board 320, a light guide panel 330, a reflective sheet 340, and optical sheets 350. The backlight unit 300 irradiates light to the display panel 100 by converting the light from the light sources 310 to a uniform surface light source through the light guide panel 330 and the optical sheets 350. Although the backlight unit 300 is illustrated as an edge type in FIG. 3, it is to be understood that the backlight unit may be a direct type without limitation to the example of FIG. 3.

Light emitting diodes may be used as the light sources 310. The light sources 310 are arranged on at least one side of the light guide panel 330 and irradiate light to the side of the light guide panel 330. The light sources 310 are mounted on the light source circuit board 320 and are driven by the light source driving circuit 271. The light source circuit board 320 is coupled to the light source driving unit 270.

The light guide panel 330 converts light from the light sources 310 to a surface light source and irradiates the surface light source to the display panel 100. The reflective sheet 340 is arranged at a lower surface of the light guide panel 330 and reflects the light, which is directed from the light guide panel 330 toward the lower part of the light guide panel 330, toward the display panel 100.

The optical sheets 350 are arranged between the light guide panel 330 and the display panel 100. The optical sheets 350 include one or more prism sheets and one or more diffusion sheets to diffuse the light entering from the light guide panel 330 and collimate the light to a light incident surface of the display panel 100 at a substantially perpendicular angle. Also, the optical sheets 350 may include a brightness enhancement film.

The guide and case member includes a bottom cover 410, a guide frame 420, and a top case 430.

Figure 9:
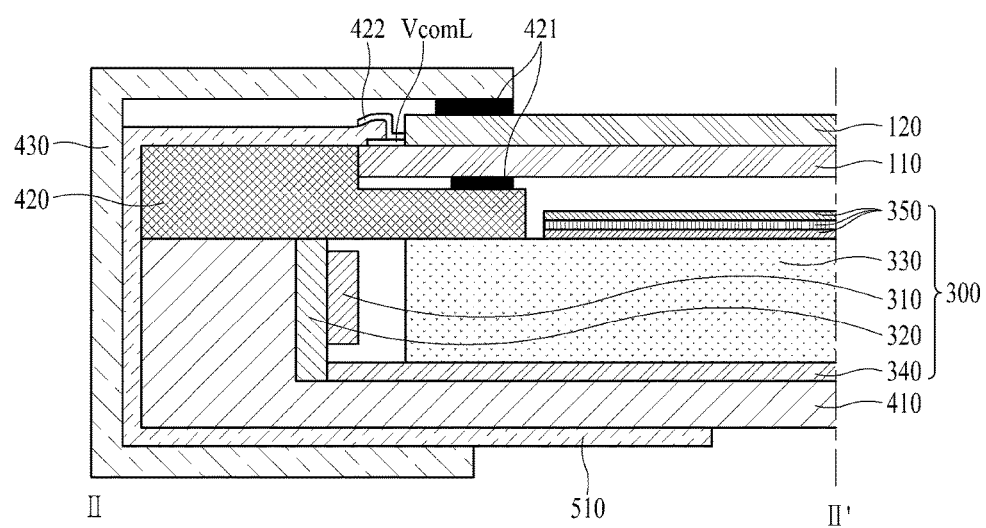
FIG. 9 is a cross-sectional view illustrating II-II' of FIG. 6 and FIG. 7.

The bottom cover 410 may be made of metal in a rectangular frame and surround a side and a bottom of the backlight unit 300 as shown in FIG. 9. The bottom cover 410 may be made of a steel sheet of high strength, for example, electro-galvanized sheet (EGI), steel use stainless (SUS), Galvarium (SGLC), aluminum coated steel sheet (AL-COSTA), and tin plated steel sheet (SPTE).

As illustrated in FIG. 9, the guide frame 420 protects the display panel 100 by supporting the lower substrate 110 of the display panel 100. The guide frame 420 may partially surround the side and bottom of the lower substrate 110. The lower substrate 110 of the display panel 100 may be attached to the guide frame 420 by using a double sided adhesive tape 421. The double sided adhesive tape 421 may also include a buffer member to protect the lower substrate 110 from impact.

The guide frame 420 may be fixed by being secured to the bottom cover 410. The guide frame 420 may be a rectangular frame, made from plastic, etc. in which glass fiber is mixed with synthetic resin such as polycarbonate, or may be made of steel use stainless (SUS).

The top case 430 surrounds the corner of the display panel 100, an upper surface and a side of the guide frame 420, and a side and a partial lower surface of the bottom cover 410. The top case 430 may be made of electro-galvanized sheet (EGI), steel use stainless (SUS), etc. The top case 430 may be fixed to the guide frame 420 by a hook or screw.

Figure 4:
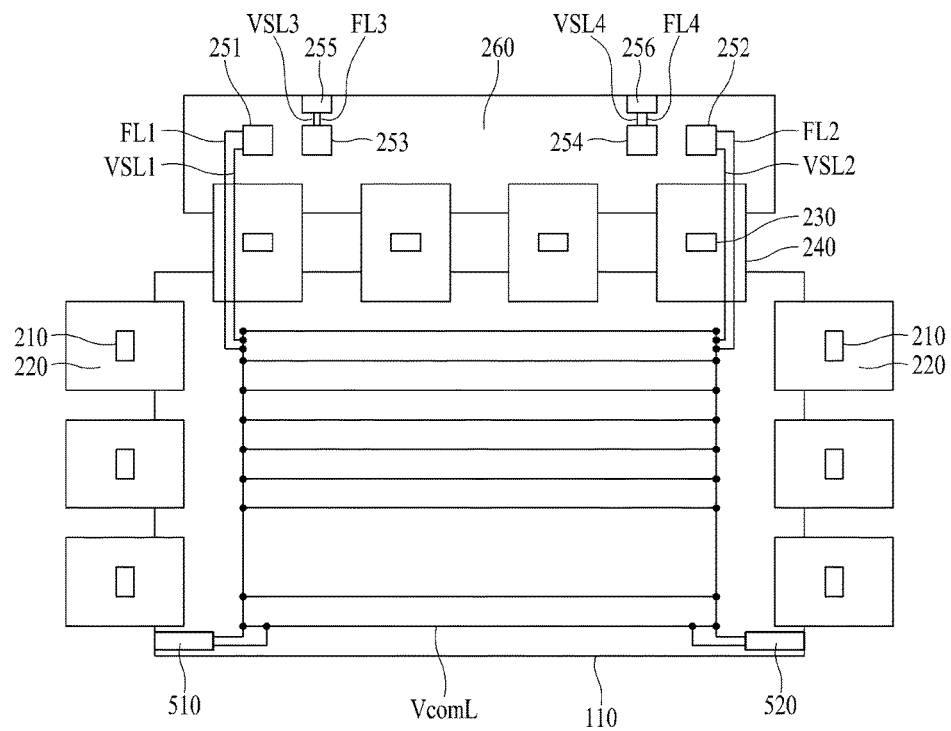
FIG. 4 is an exemplary view illustrating a lower substrate, gate flexible films and source flexible films attached onto the lower substrate, a common voltage line provided on the lower substrate, common voltage supply lines and feedback lines.

FIG. 4 is an exemplary view illustrating a lower substrate, gate flexible films and source flexible films attached onto the lower substrate, a common voltage line on the lower substrate, common voltage supply lines, and feedback lines. In FIG. 4, for convenience of description, the lower substrate 110, gate flexible films 220 on which the gate driving circuits 210 are mounted, source flexible films 240 on which the source driving circuits 230 are mounted, common voltage compensation units 251, 252, 253, and 254, connection terminals 255 and 256, a circuit board 260, the common voltage line VcomL, common voltage supply lines VSL1, VSL2, VSL3, and VSL4, and feedback lines FL1, FL2, FL3, and FL4 are only shown.

Referring to FIG. 4, the common voltage line VcomL is on the lower substrate 110. The common voltage line VcomL may include a plurality of first lines in parallel along a first direction, and a plurality of second lines coupled to the plurality of first lines and in parallel along a second direction crossing the first direction. That is, because the common voltage line VcomL may be in a mesh structure as shown in FIG. 4, a potential of the common voltage of the common voltage line VcomL may be uniform regardless of the location of the lower substrate 110. Here, the first direction may be parallel with the gate lines, and the second direction may be parallel with the data lines. The mesh structure denotes a net structure, thus the common voltage line VcomL having the mesh structure denotes that the common voltage line VcomL is formed in direction of both the gate lines and the data lines.

The first common voltage compensation circuit 251 may be coupled to the first common voltage supply line VSL1 and the first feedback line FL1. The first common voltage supply line VSL1 and the first feedback line FL1 may be on the circuit board 260. The source flexible film 240, and the lower substrate 110, and may be coupled to the common voltage line VcomL at one side of the lower substrate to which the source flexible film 240 is attached. In FIG. 4, the first common voltage supply line VSL1 and the first feedback line FL1 are coupled to the common voltage line VcomL at an upper side (specifically, upper left side) of the lower substrate 110 to which the source flexible film 240 is attached. As a result, the first common voltage compensation circuit 251 may receive the common voltage of the common voltage line VcomL affected by unspecified noise generated in the display panel 100, the common voltage being fed back from the first feedback line FL1, and may output the compensated common voltage through the first common voltage supply line VSL1 to the common voltage line VcomL.

The second common voltage compensation circuit 252 may be coupled to the second common voltage supply line VSL2 and the second feedback line FL2. The second common voltage supply line VSL2 and the second feedback line FL2 may be on the circuit board 260. The source flexible film 240, and the lower substrate 110, and may be coupled to the common voltage line VcomL at one side of the lower substrate to which the source flexible film 240 is attached. In FIG. 4, the second common voltage supply line VSL2 and the second feedback line FL2 are coupled to the common voltage line VcomL at an upper side (specifically, upper right side) of the lower substrate 110 adjacent to the circuit board 260. As a result, the second common voltage compensation circuit 252 may receive the common voltage of the common voltage line VcomL affected by unspecified noise generated in the display panel 100, the common voltage being fed back from the second feedback line FL2, and may output the compensated common voltage through the second common voltage supply line VSL2 to the common voltage line VcomL.

The third common voltage compensation circuit 253 may be coupled to the third common voltage supply line VSL3 and the third feedback line FL3. The third common voltage supply line VSL3 and the third feedback line FL3 are coupled to the first connection terminal 255 on the circuit board 260. The first connection terminal 255 may be coupled to the first line cable 510. The first line cable 510 may be on the lower surface and side of the bottom cover, the side and upper surface of the guide frame, and the upper surface of the lower substrate 110. Therefore, the first line cable 510 coupled to the first connection terminal 255 may be coupled to the common voltage line VcomL at an opposite side of the lower substrate to which the source flexible film 240 is attached, by passing the lower surface and side of the bottom cover, the side and upper surface of the guide frame, and the upper surface of the lower substrate 110. In FIG. 4, the first line cable 510 is coupled to the common voltage line VcomL at a lower side (specifically, lower left side) which is an opposite side of the upper side of the lower substrate 110 to which the source flexible film 240 is attached. The first line cable 510 will be described later in detail with reference to FIGS. 7 to 13. As a result, the third common voltage compensation circuit 253 may receive the common voltage of the common voltage line VcomL affected by unspecified noise generated in the display panel 100, the common voltage being fed back through the first line cable 510, the first connection terminal 255 and the third feedback line FL3, and may output the compensated common voltage through the third common voltage supply line VSL3, the first connection terminal 255 and the first line cable 510 to the common voltage line VcomL.

The fourth common voltage compensation circuit 254 may be coupled to the fourth common voltage supply line VSL4 and the fourth feedback line FL4. As illustrated, the fourth common voltage supply line VSL4 and the fourth feedback line FL4 are coupled to the second connection terminal 256 on the circuit board 260. The second connection terminal 256 may be coupled to the second line cable 520. The second line cable 520 may be on the lower surface and side of the bottom cover, the side and upper surface of the guide frame, and the upper surface of the lower substrate 110. Therefore, the second line cable 520 coupled to the second connection terminal 256 may be coupled to the common voltage line VcomL at an opposite side of the lower substrate to which the source flexible film 240 is attached, by passing the lower surface and the side of the bottom cover, the side and upper surface of the guide frame, and the upper surface of the lower substrate 110. In FIG. 4, the second line cable 520 is coupled to the common voltage line VcomL at a lower side (specifically, lower left side) which is an opposite side of the upper side of the lower substrate 110 to which the source flexible film 240 is attached. The second line cable 520 will be described later in detail with reference to FIGS. 7 to 13. As a result, the fourth common voltage compensation circuit 254 may receive the common voltage of the common voltage line VcomL affected by unspecified noise generated in the display panel 100, the common voltage being fed back through the second line cable 520, the second connection terminal 256 and the fourth feedback line FL4, and may output the compensated common voltage through the fourth common voltage supply line VSL4, the second connection terminal 256 and the first line cable 520 to the common voltage line VcomL.

As described above, according to the embodiment, the common voltage supply circuit and the connection terminal coupled thereto are on the circuit board 260, and the line cable coupled to the connection terminal is coupled to the common voltage line VcomL at an opposite side of the lower substrate to which the source flexible film 240 is attached. As a result, in the embodiment, the length of the line for connecting the common voltage supply circuit with the common voltage line VcomL at an opposite side of the lower substrate to which the source flexible film is attached may be reduced. Therefore, resistance of the line for connecting the common voltage supply circuit with the common voltage line VcomL at an opposite side of the lower substrate to which the source flexible film 240 is attached may be reduced. Also, because the gate printed circuit board attached to the gate flexible films 220 is not included in the embodiment, the cost associated with the gate printed circuit board may be eliminated.

Figure 5:
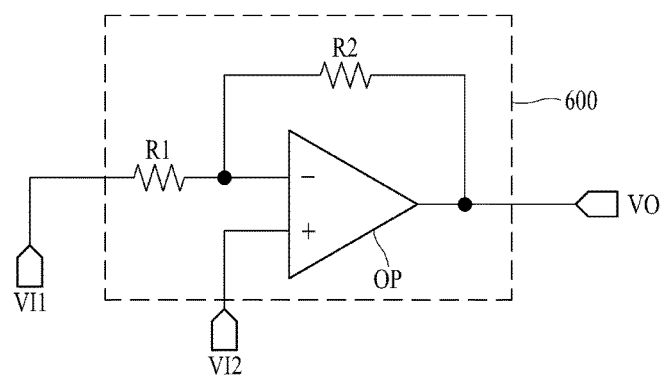
FIG. 5 is a circuit view illustrating an example of a common voltage compensation circuit of FIG. 4.

FIG. 5 is a circuit schematic illustrating an example of a common voltage compensation circuit of FIG. 4. Although each of the first to fourth common compensation circuits 251, 252, 253, and 254 may be as shown in FIG. 5, it is to be understood that each of the first to fourth common compensation circuits is not limited to the example of FIG. 5. That is, each of the first to fourth common compensation circuits 251, 252, 253, and 254 may output a compensated common voltage by using other circuits which are already known.

Referring to FIG. 5, each of the first to fourth common compensation circuits 251, 252, 253, and 254 includes a first power input terminal VI1, a second power input terminal VI2, an output terminal VO, and an inverting amplifier 600.

The first power input terminal VI1 may be coupled to any one of the first to fourth feedback lines FL1, FL2, FL3, and FL4. That is, a feedback voltage is supplied to the first power input terminal VI1. The common voltage may be affected by unspecified noise generated in the display panel 100. Thus, the feedback voltage is the common voltage affected by noise.

The second power input terminal VI2 may be coupled to a reference common voltage line to which a reference common voltage is supplied. That is, the reference common voltage may be supplied to the second power input terminal VI2. The reference common voltage may be a direct current voltage input from a power supply source.

The common voltage output terminal VO may be coupled to any one of the first to fourth common voltage supply lines SVL1, SVL2, SVL3, and SVL4. That is, a compensated common voltage is output from the common voltage output terminal VO.

The inverting amplifier 600 includes an OP-AMP OP, a first resistor R1, and a second resistor R2. The OP-AMP OP includes a non-inverting input terminal (+) coupled to the second power input terminal VI2, receiving a reference common voltage which is a direct current power voltage, and an inverting input terminal (−) coupled to the first power input terminal VI1, receiving a feedback voltage. The first resistor R1 is coupled between the inverting input terminal (−) of the OP-AMP OP and the first power input terminal VI1. The second resistor R2 is coupled between the inverting input terminal (−) of the OP-AMP OP and the output terminal.

The inverting amplifier 600 compensates for a difference between the feedback voltage input to the inverting input terminal (−) of the OP-AMP OP and the reference common voltage input to the non-inverting terminal (+) at a first amplifying ratio, and outputs the result value.

$$CVcom = VREF + \frac{RV2}{RV1} \times (VREF - VFB) \quad \text{[Equation 1]}$$

In the Equation 1, Vout is the compensated common voltage output to the output terminal of the OP-AMP OP, VREF is the reference common voltage input to the non-inverting input terminal (+), and VFB is the feedback voltage input to the inverting input terminal (−). RV1 is a resistance value of the first resistor R1, and RV2 is a resistance value of the second resistor R2.

As described above, each of the first to fourth common compensation circuits 251, 252, 253, and 254 may generate a compensated common voltage CVcom, which is obtained by compensating for the common voltage affected by noise, by using the feedback voltage corresponding to the common voltage affected by noise, the direct current reference common voltage VREF input from the power supply source, and output the generated common voltage.

Figure 6:
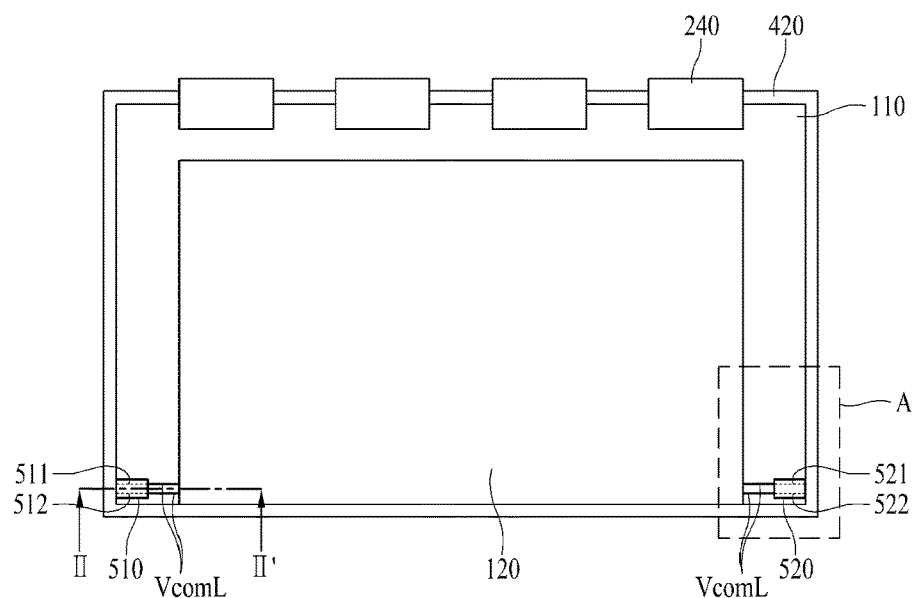
FIG. 6 is a plane view illustrating a liquid crystal display according to the embodiment of the present invention.
Figure 7:
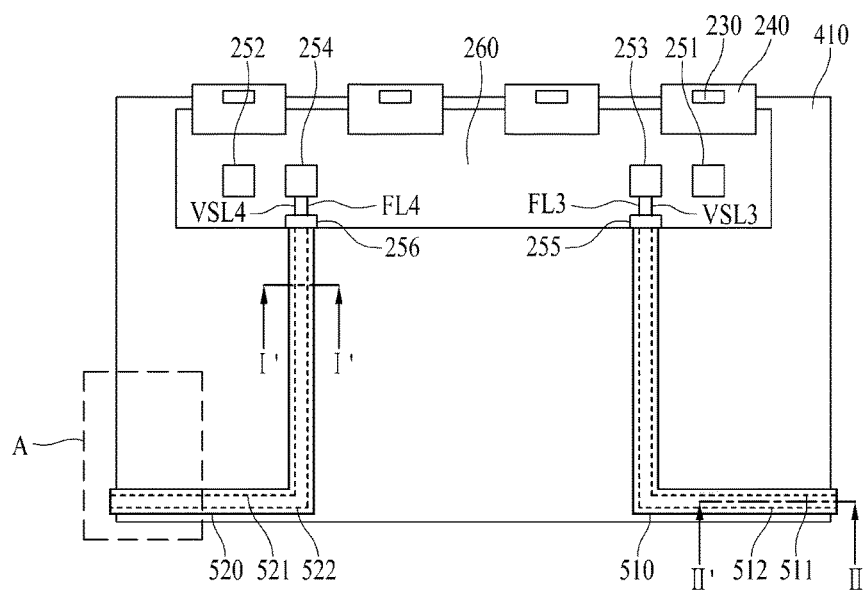
FIG. 7 is a rear view illustrating a liquid crystal display according to the embodiment of the present invention.
Figure 8:
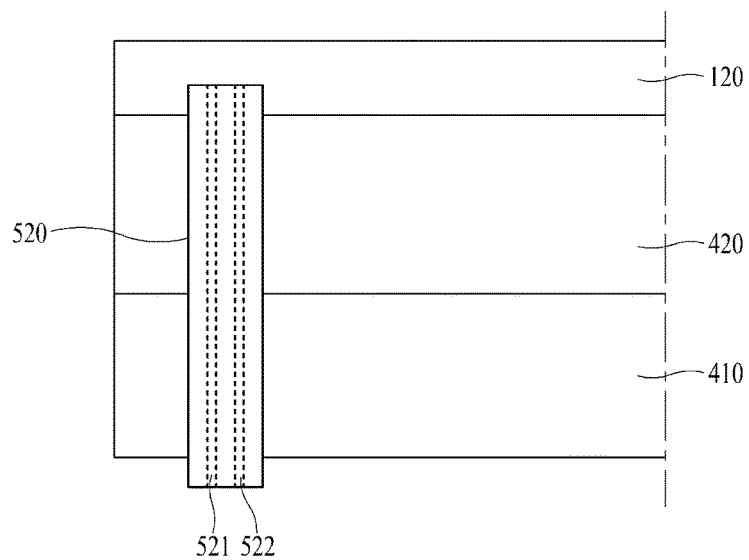
FIG. 8 is a side view illustrating an example of a portion A of FIGS. 6 and 7.

FIG. 6 is a plane view illustrating a liquid crystal display according to the embodiment. FIG. 7 is a rear view illustrating a liquid crystal display according to the embodiment. FIG. 8 is a side view illustrating an example of a portion A of FIGS. 6 and 7. FIG. 9 is a cross-sectional view illustrating II-II' of FIG. 6 and FIG. 7. In FIGS. 6 to 8, for convenience of description, the gate driving circuits 210, the gate flexible films 220, and the top case 430 may be omitted.

In FIGS. 6 to 8, the source flexible films 240 are bent toward the rear surface of the display panel 100. To reduce a bezel size of the liquid crystal display, the source flexible films 240 are bent toward the rear surface of the display panel 100 as shown in FIGS. 6 to 8. The bezel at an outer edge of the liquid crystal display and corresponds to a non-display area where images are not displayed.

Connection of the third common voltage compensation circuit 253, the third common voltage supply line VSL3, the third feedback line FL3, the first connection terminal 255, the first line cable 510 and the common voltage line VcomL will be described in detail with reference to FIGS. 6 to 9.

The third common voltage compensation circuit 253, the third common voltage supply line VSL3, the third feedback line FL3, and the first connection terminal 255 are on the circuit board 260. The first line cable 510 is on the lower surface and side of the bottom cover 410, the side and upper surface of the guide frame 420, and the upper surface of the lower substrate 110.

The third common voltage compensation circuit 253 is coupled to the third common voltage supply line VSL3 and the third feedback line FL3. The third common voltage supply line VSL3 and the third feedback line FL3 are coupled to the first connection terminal 255. That is, the third common voltage supply line VSL3 and the third feedback line FL3 connect the third common voltage compensation circuit 253 with the first connection terminal 255.

The first connection terminal 255 may be coupled to the first line cable 510. In more detail, the first line cable 510 may include a first line 511 for receiving a compensation common voltage from the third common voltage supply line VSL3 through the first connection terminal 255 and a second line 512 for supplying a feedback voltage to the third feedback line FL3 through the first connection terminal 255. The connection structure of the first line cable 510 and the first connection terminal 255 will be described later in detail with reference to FIGS. 11A and 11B.

Figure 10:
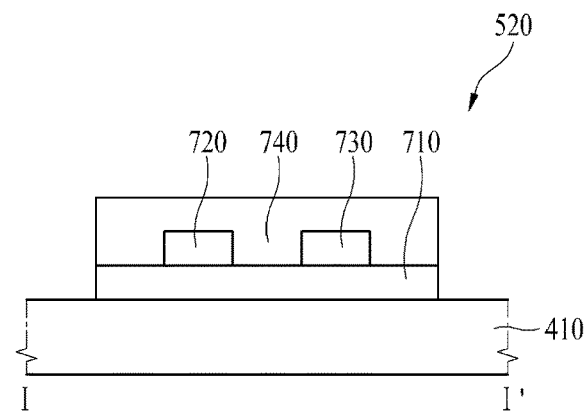
FIG. 10 is a cross-sectional view illustrating I-I' of FIG. 7.

A flat flexible cable may be used as the first line cable 510. The first line cable 510, as shown in FIG. 10, may include a first insulating film 710 on the bottom cover 410, lines 720 and 730 on the first insulating film 710, and a second insulating film 740 to cover the first insulating film 710 and the lines 720 and 730. In FIG. 10, the lines 720 and 730 may be the first and second lines 511 and 512.

The first line cable 510 coupled to the first connection terminal 255 may be coupled to the common voltage line VcomL at an opposite side of the lower substrate 110 to which the source flexible film 240 is attached, by passing the lower surface and side of the bottom cover 410 and the side and upper surface of the guide frame 420. The first line cable 510 may be coupled to the common voltage line VcomL on a corner of the lower substrate 110, which is not covered by the upper substrate 120.

The first and second lines 511 and 512 may be exposed at one end of the first line cable 510 coupled to the common voltage line VcomL. In this case, the exposed first and second lines 511 and 512 may be coupled to the common voltage line VcomL by soldering. Alternatively, the exposed first and second lines 511 and 512 may be coupled to the common voltage line VcomL through a conductive adhesive, a conductive adhesive tape, or an anisotropic conductive film. Moreover, an insulating tape 422 may be attached onto the first line cable 510 and the common voltage line VcomL as shown in FIG. 9.

As a result, the third common voltage compensation circuit 253 may receive the feedback voltage from the common voltage line VcomL through the second line 512 of the first line cable 510, the first connection terminal 255 and the third feedback line FL3. Also, the third common voltage compensation circuit 253 may output the compensated common voltage to the common voltage line VcomL through the third common voltage supply line VSL3, the first connection terminal 255 and the first line 511 of the first line cable 510.

Next, connection of the fourth common voltage compensation circuit 254, the fourth common voltage supply line VSL4, the fourth feedback line FL4, the second connection terminal 256, the second line cable 520 and the common voltage line VcomL will be described in detail with reference to FIGS. 6 to 9.

The fourth common voltage compensation circuit 254, the fourth common voltage supply line VSL4, the fourth feedback line FL4, and the second connection terminal 256 are on the circuit board 260. The second line cable 520 is on the lower surface and side of the bottom cover 410, the side and upper surface of the guide frame 420, and the lower substrate 110. If the first line cable 510 is on one side of the bottom cover 410 and one side of the guide frame 420, the second line cable 520 may be on the other side of the bottom cover and the other side of the guide frame 420.

The fourth common voltage compensation circuit 254 may be coupled to the fourth common voltage supply line VSL4 and the fourth feedback line FL4. The fourth common voltage supply line VSL4 and the fourth feedback line FL4 are coupled to the second connection terminal 256. That is, the fourth common voltage supply line VSL4 and the fourth feedback line FL4 connect the fourth common voltage compensation circuit 254 with the second connection terminal 256.

The second connection terminal 256 may be coupled to the second line cable 520. In more detail, the second line cable 520 may include a third line 521 for receiving a compensation common voltage from the fourth common voltage supply line VSL4 through the second connection terminal 256 and a fourth line 522 for supplying a feedback voltage to the fourth feedback line FL3 through the second connection terminal 256.

A flat flexible cable may be used as the second line cable 520. Similar to the first line cable 510, the second line cable 520, as shown in FIG. 10, may include a first insulating film 710 on the bottom cover 410, lines 720 and 730 on the first insulating film 710, and a second insulating film 740 to cover the first insulating film 710 and the lines 720 and 730. In FIG. 10, the lines 720 and 730 may be the third and fourth lines 521 and 522.

The second line cable 520 coupled to the second connection terminal 256 is coupled to the common voltage line VcomL at an opposite side of the lower substrate 110 to which the source flexible film 240 is attached, by passing the lower surface and side of the bottom cover 410 and the side and upper surface of the guide frame 420. The second line cable 520 may be coupled to the common voltage line VcomL on a corner of the lower substrate 110, which is not covered by the upper substrate 120.

The third and fourth lines 521 and 522 may be exposed at one end of the second line cable 520 coupled to the common voltage line VcomL. In this case, the exposed third and fourth lines 521 and 522 may be coupled to the common voltage line VcomL by soldering. Alternatively, the exposed third and fourth lines 521 and 522 may be coupled to the common voltage line VcomL through a conductive adhesive, a conductive adhesive tape, or an anisotropic conductive film. Moreover, an insulating tape 422 may be attached onto the second line cable 520 and the common voltage line VcomL as shown in FIG. 9.

As a result, the fourth common voltage compensation circuit 254 may receive the feedback voltage from the common voltage line VcomL through the fourth line 522 of the second line cable 520, the second connection terminal 256 and the fourth feedback line FL4. Also, the fourth common voltage compensation circuit 254 may output the compensated common voltage to the common voltage line VcomL through the fourth common voltage supply line VSL4, the second connection terminal 256 and the second line 521 of the second line cable 520.

Figure 11A:
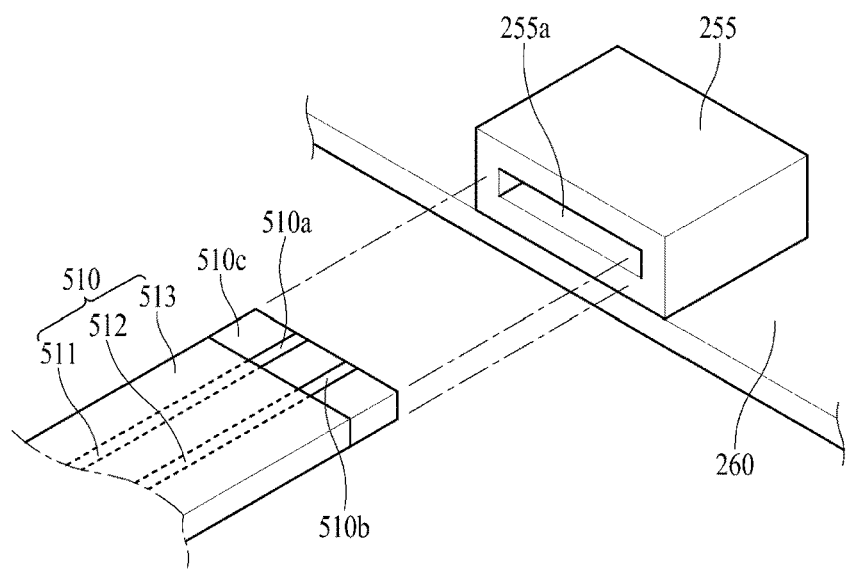
FIGS. 11A and 11B are perspective views illustrating examples of a connection structure between a first line cable of FIG. 7 and a first connection terminal of a circuit board.
Figure 11B:
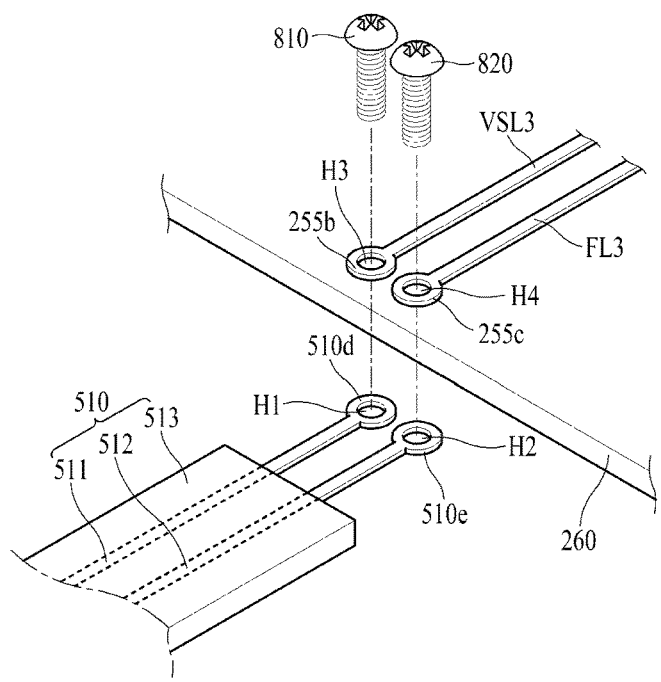

FIGS. 11A and 11B are perspective views illustrating examples of a connection structure between a first line cable of FIG. 7 and a first connection terminal of a circuit board. In FIG. 11A, a flat flexible cable is used as the first line cable 510. In this case, the first line cable 510 may include first and second lines 511 and 512 and an insulating material 513 that covers the first and second lines 511 and 512.

Referring to FIG. 11A, a connector 510*c* from which junction pins 510*a* and 510*b* are exposed may be at one end of the first line cable 510. The first junction pin 510*a* may be coupled to the first line 511, and the second junction pin 510*b* may be coupled to the second line 512.

The first connection terminal 255 may include a connector insertion unit 255*a* to which the connector 510*c* of the first line cable 510 is inserted. Junction terminals may be inside the connector insertion unit 255*a*. It is to be noted that the junction terminals are not shown in FIG. 11A.

As a result, as the connector 510*c* at one end of the first line cable 510 is inserted to the connector insertion unit 255*a* of the first connection terminal 255, the junction pins 510*a* and 510*b* of the first line cable 510 may be electrically coupled to the junction terminals. That is, in the embodiment, the connector 510*c* having the junction pins 510*a* and 510*b* are at one end of the first line cable 510, and the connector insertion unit 255*a* having junction terminals is at the first connection terminal 255, whereby the first line cable 510 may easily be coupled to the first connection terminal 255.

Because a connection structure of the second line cable 520 and the second connection terminal 256 may be configured in substantially the same manner as the embodiment shown in FIG. 11A, its detailed description will be omitted.

FIG. 11B is a perspective view illustrating another example of a connection structure between a first line cable of FIG. 7 and a first connection terminal of a circuit board. In FIG. 11B, a flat flexible cable is used as the first line cable 510.

Referring to FIG. 11B, connection pins 510d and 510e made of a conductive material may be at one end of the first line cable 510. A hole to which a fixed member may be inserted may be provided at each of the connection pins 510d and 510e. For example, as shown in FIG. 11B, a first hole H1 to which a first fixed member 810 may be inserted may be at the first connection pin 510d, and a second hole H2 to which a second fixed member 820 may be inserted may be at the second connection pin 510e. The first connection pin 510d may be coupled to the first line 511 and the second connection pin 510e may be coupled to the second line 512. Although the first and second fixed members 810 and 820 are screws as shown, it is to be understood that the first and second fixed members are not limited to the example of FIG. 11B.

The first connection terminal 255 may include connection pins 255b and 255c made of a conductive material. A hole, to which a fixed member may be inserted, and which passes through the circuit board, may be provided at each of the connection pins 255b and 255c. For example, as shown in FIG. 11B, a third hole H3 to which the first fixed member 810 may be inserted may be provided at the third connection pin 255b, and a fourth hole H4 to which the second fixed member 820 may be inserted may be provided at the second connection pin 255c. The third connection pin 255b may be coupled to the third common voltage line VSL3, and the fourth connection pin 255c may be coupled to the third feedback line FL3.

As a result, the first fixed member 810 is inserted to the first hole H1 of the first connection pin 510d and the third hole H3 of the third connection pin 255b and thus fixed to a fixed member insertion unit (not shown) provided at the bottom cover 410, whereby the first connection pin 510d of the first line cable 510 may be coupled to the third connection pin 255b of the first connection terminal 255. Also, the second fixed member 820 is inserted to the second hole H2 of the second connection pin 510e and the fourth hole H4 of the fourth connection pin 255d and thus fixed to the fixed member insertion unit (not shown) provided at the bottom cover 410, whereby the second connection pin 510e of the first line cable 510 may be coupled to the fourth connection pin 255c of the first connection terminal 255. That is, in the embodiment, the connection pin having a hole is provided at one end of the first line cable 510, and the first connection terminal 255 has the connection pin having a hole, whereby the first line cable 510 may easily be coupled to the first connection terminal 255 by using the fixed member.

Because a connection structure of the second line cable 520 and the second connection terminal 256 may be configured in substantially the same manner as the embodiment shown in FIG. 11B, its detailed description will be omitted.

Figure 12:
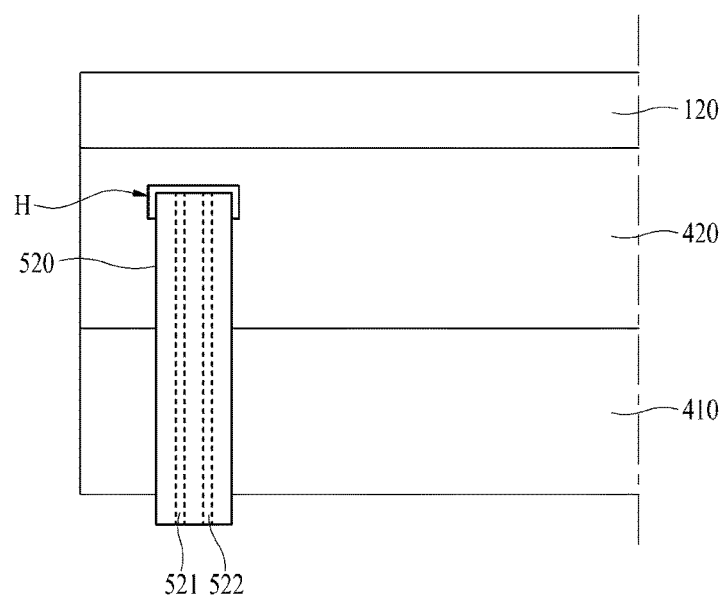
FIG. 12 is a side view illustrating example of a portion A of FIG. 5.
Figure 13:
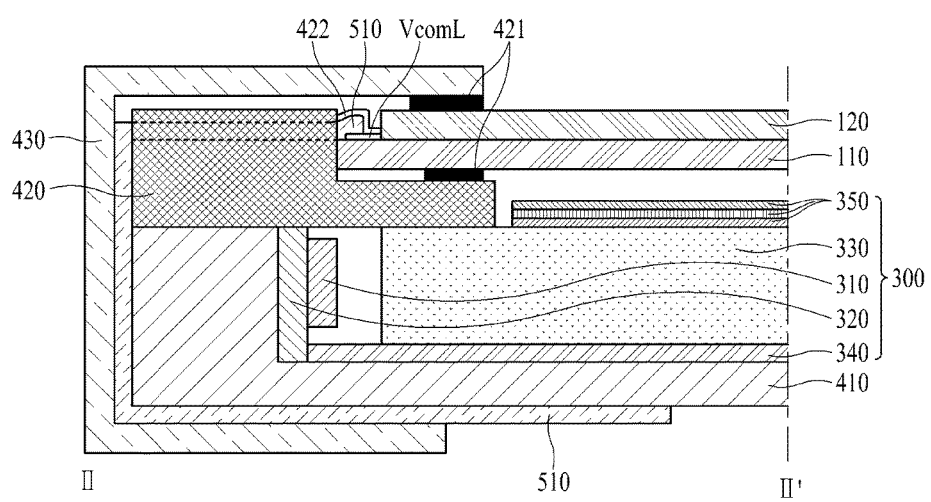
FIG. 13 is a cross-sectional view of FIG. 6.

FIG. 12 is a side view illustrating another example of a portion A of FIGS. 6 and 7. FIG. 13 is a cross-sectional view illustrating III-III' of FIG. 6 and FIG. 7. In FIG. 12, for convenience of description, the gate driving circuits 210, the gate flexible films 220, and the top case 430 are omitted.

In FIGS. 6, 7, and 12, the source flexible films 240 are bent toward the rear surface of the display panel 100. To reduce a bezel size of the liquid crystal display, the source flexible films 240 are bent toward the rear surface of the display panel 100 as shown in FIGS. 6, 7, and 12. The bezel is at an outer edge of the liquid crystal display and corresponds to a non-display area where images are not displayed.

Connection of the third common voltage compensation circuit 253, the third common voltage supply line VSL3, the third feedback line FL3, the first connection terminal 255, the first line cable 510, and the common voltage line VcomL will be described in detail with reference to FIGS. 6, 7, 12, and 13.

The third common voltage compensation circuit 253, the third common voltage supply line VSL3, the third feedback line FL3, and the first connection terminal 255 are on the circuit board 260. The first line cable 510 is on the lower surface and side of the bottom cover 410, the side of the guide frame 420, a hole H formed in the guide frame 420, and the lower substrate 110.

The third common voltage compensation circuit 253, the third common voltage supply line VSL3, the third feedback line FL3 and the first connection terminal 255, which are shown in FIGS. 6, 7, 12, and 13 are substantially the same as those described with reference to FIGS. 6 to 9. Therefore, a detailed description of the third common voltage compensation circuit 253, the third common voltage supply line VSL3, the third feedback line FL3 and the first connection terminal 255, which are shown in FIGS. 6, 7, 12, and 13, will be omitted.

The first line cable 510 coupled to the first connection terminal 255 may be coupled to the common voltage line VcomL at an opposite side of the lower substrate 110 to which the source flexible film 240 is attached, by passing the lower surface and side of the bottom cover 410 and the side of the guide frame 420, and the hole H provided in the guide frame 420. If the guide frame 420 surrounds the side of the upper substrate 120 and a partial side and lower surface of the lower substrate 110, the hole H for passing through the first line cable 510 may be included. For this reason, the first line cable 510 may be coupled to the common voltage line VcomL on a corner of the lower substrate 110, which is not covered by the upper substrate 120.

The first and second lines 511 and 512 may be exposed at one end of the first line cable 510 coupled to the common voltage line VcomL. In this case, the exposed first and second lines 511 and 512 may be coupled to the common voltage line VcomL by soldering. Alternatively, the exposed first and second lines 511 and 512 may be coupled to the common voltage line VcomL through a conductive adhesive, a conductive adhesive tape, or an anisotropic conductive film. Moreover, an insulating tape 422 may be attached onto the first line cable 510 and the common voltage line VcomL as shown in FIG. 13.

As a result, the third common voltage compensation circuit 253 may receive the feedback voltage from the common voltage line VcomL through the second line 512 of the first line cable 510, the first connection terminal 255, and the third feedback line FL3. Also, the third common voltage compensation circuit 253 may output the compensated common voltage to the common voltage line VcomL through the third common voltage supply line VSL3, the first connection terminal 255, and the first line 511 of the first line cable 510.

Connection of the fourth common voltage compensation circuit 254, the fourth common voltage supply line VSL4, the fourth feedback line FL4, the second connection terminal 256, the second line cable 520 and the common voltage line VcomL can be configured similarly to that of the third common voltage compensation circuit 253 described above with reference to FIGS. 6, 7, 12, and 13.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
a display panel including a first substrate and a second substrate;
a source driver flexible film attached to the second substrate;
a source driver circuit attached to the source driver flexible film;
a common voltage line provided on the second substrate;
common voltage supply lines and common voltage feedback lines connected to the common voltage line;
common voltage compensation circuits connected to the common voltage supply lines and common voltage feedback lines; and
a guide frame,
wherein the common voltage compensation circuits include a first circuit line coupled to the common voltage line at an opposite side of the second substrate to which the source driver flexible film is attached and disposed on one side of the guide frame, and a second circuit line on an other side of the guide frame.

2. The display device of claim 1, wherein the circuit line is routed through a hole in the guide frame.

3. The display device of claim 1, further comprising a cover adjacent to the guide frame.

4. The display device of claim 1, wherein two common voltage compensation circuits each include a cable line that is routed at a rear of the display panel to two connection terminals, respectively, on the source driver circuit.

5. The display device of claim 1, wherein the common voltage line includes a plurality of first lines parallel to each other along a first direction, and a plurality of second lines coupled to the plurality of first lines,
wherein the second lines are parallel to each other along a second direction crossing the first direction.

6. The display device of claim 1, wherein the common voltage compensation circuits include first to fourth common voltage compensation circuits.

7. The display device of claim 6, wherein each of the first to fourth common compensation circuits generate a compensated common voltage, obtained by compensating for common voltage affected by noise, using feedback voltage from the common voltage feedback lines corresponding to the common voltage affected by noise, and a direct current reference common voltage input from a power supply source, and output the compensated common voltage.

8. The display device of claim 1, wherein at least one common voltage supply line and one common voltage feedback line are routed through the source driver flexible film to a corresponding common voltage compensation circuit.

9. The display device of claim 1, wherein the circuit line is a flexible film.

10. The display device of claim 1, wherein the display panel is a liquid crystal display.

11. The display device of claim 9, wherein the flexible film includes a connector with junction pins, wherein the connector is inserted into to a connection insertion unit of the connection terminal.

12. The display device of claim 9, wherein the flexible film includes a connector with junction pins that is coupled to connection pins of the connection terminal by inserting a fixing member in holes of the junction pins and the connection pins.

13. A method of fabricating a display device, comprising:
providing a display panel including a first substrate and a second substrate;
attaching a source driver flexible film to the second substrate;
attaching a source driver circuit to the source driver flexible film;
providing a common voltage line on the second substrate;
connecting common voltage supply lines and common voltage feedback lines to the common voltage line;
connecting common voltage compensation circuits to the common voltage supply lines and the common voltage feedback lines;
providing a guide frame supporting the display panel; and
connecting the common voltage compensation circuits including a first circuit line coupled to the common voltage line at an opposite side of the second substrate to which the source driver flexible film is attached and disposed on one side of a guide frame, and a second circuit line on an other side of the guide frame.

14. The method of claim 13, further comprising routing the circuit line through a hole in the guide frame.

15. The method of claim 13, further comprising:
providing a cover adjacent to the guide frame.

16. The method of claim 13, wherein at least one common voltage supply line and one common voltage feedback line is routed through the source driver flexible film to a corresponding common voltage compensation circuit.

17. The method of claim 13, wherein the circuit line is a flexible film.

18. The method of claim 13, wherein the display panel is a liquid crystal display.

19. A display device, comprising:
a display panel including a first substrate and a second substrate;
a source driver flexible film attached to the second substrate;
a source driver circuit attached to the source driver flexible film;
a common voltage line provided on the second substrate;
common voltage supply lines and common voltage feedback lines connected to the common voltage line;
common voltage compensation circuits connected to the common voltage supply lines and common voltage feedback lines;
a circuit board connecting to the source driver flexible film and disposed at a rear of the display panel; and
a circuit line including one end connected to a connection terminal of the circuit board and the other end connected to the common voltage line at an opposite side of the second substrate to which the source driver flexible film is attached.

* * * * *